US012752728B2

(12) United States Patent
Holzer et al.

(10) Patent No.: US 12,752,728 B2
(45) Date of Patent: Oct. 6, 2026

(54) IMPACT ABSORBER HAVING SENSING AMPLIFIER

(71) Applicant: Bayerische Motoren Werke Aktiengesellschaft, Munich (DE)

(72) Inventors: Dominik Holzer, Taufkirchen (DE); Manuel Schroeder, Oberhaching (DE); Markus Stolp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 18/562,923

(22) PCT Filed: Jun. 27, 2022

(86) PCT No.: PCT/EP2022/067503
§ 371 (c)(1),
(2) Date: Nov. 21, 2023

(87) PCT Pub. No.: WO2023/285118
PCT Pub. Date: Jan. 19, 2023

(65) Prior Publication Data
US 2024/0270189 A1 Aug. 15, 2024

(30) Foreign Application Priority Data
Jul. 13, 2021 (DE) ..................... 10 2021 118 025.2

(51) Int. Cl.
*B60R 19/22* (2006.01)
*B60R 19/48* (2006.01)
*B60R 19/18* (2006.01)

(52) U.S. Cl.
CPC ............ *B60R 19/22* (2013.01); *B60R 19/483* (2013.01); *B60R 2019/1873* (2013.01)

(58) Field of Classification Search
None
See application file for complete search history.

(56) References Cited

U.S. PATENT DOCUMENTS 6,913,300 B2 * 7/2005 Mori ........................ B60R 19/18 293/133
8,075,029 B2 * 12/2011 Takahashi ............. B60R 19/483 293/121
(Continued)

FOREIGN PATENT DOCUMENTS

CN 109895723 A 6/2019
DE 20 2004 005 434 U1 9/2004
(Continued)

OTHER PUBLICATIONS

International Search Report (PCT/ISA/210) issued in PCT Application No. PCT/EP2022/067503 dated Oct. 18, 2022 with English translation (4 pages).
(Continued)

*Primary Examiner* — Aaron L Lembo
(74) *Attorney, Agent, or Firm* — Crowell & Moring LLP

(57) ABSTRACT

An impact absorber is provided for a bumper arrangement on a motor vehicle. The impact absorber can be fastened to a cross member of the motor vehicle and is designed to at least partially absorb the energy input acting on the impact absorber in the event of a collision and to provide the energy input to a force transfer portion, which can be operatively connected to a pressure sensor device, such that the collision can be detected by the pressure sensor device. The impact absorber has an absorption portion and a force transmission portion. The force transmission portion is designed to at least partially transfer input energy, acting in the event of the collision, to the force transfer portion, bypassing the absorption portion in some regions. The force transmission portion is designed such that it collapses in the event of input energy which is so high that the collision can be detected by the pressure sensor device without bypassing the absorption portion in some regions.

10 Claims, 2 Drawing Sheets

(56) References Cited

U.S. PATENT DOCUMENTS

| | | | | |
|---|---|---|---|---|
| 8,972,116 | B2 * | 3/2015 | Leach | B60R 21/0132 180/274 |
| 9,067,553 | B1 * | 6/2015 | Ghannam | B60R 21/0136 |
| 9,610,913 | B2 * | 4/2017 | Narita | B60R 21/0136 |
| 9,643,555 | B2 * | 5/2017 | Rahe | B60R 19/12 |
| 9,718,423 | B2 * | 8/2017 | Higashimachi | B60R 19/483 |
| 9,834,164 | B1 * | 12/2017 | Lyer | B60R 21/38 |
| 9,919,669 | B2 * | 3/2018 | Nickel | B60R 19/18 |
| 9,944,242 | B2 * | 4/2018 | Higashimachi | B60R 19/22 |
| 10,259,412 | B1 | 4/2019 | Krishnappa et al. | |
| 10,618,487 | B2 * | 4/2020 | Syvertsen | B60R 19/03 |
| 11,186,242 | B2 * | 11/2021 | Aizawa | B60R 19/483 |
| 11,318,908 | B2 * | 5/2022 | Lang | B60R 21/0136 |
| 11,332,092 | B2 * | 5/2022 | Koenig | B60W 40/10 |
| 11,358,548 | B2 * | 6/2022 | Park | B60R 21/0136 |
| 11,560,107 | B2 * | 1/2023 | Kashiwagi | B60R 19/18 |
| 2009/0108598 | A1 | 4/2009 | Takahashi | |
| 2015/0367799 | A1 * | 12/2015 | Le | B60R 19/483 73/12.09 |

FOREIGN PATENT DOCUMENTS

| | | | |
|---|---|---|---|
| DE | 10 2005 018 588 | A1 | 11/2006 |
| DE | 10 2012 005 275 | A1 | 11/2012 |
| DE | 10 2014 214 595 | A1 | 1/2016 |
| DE | 10 2015 112 627 | A1 | 2/2016 |
| DE | 10 2014 223 822 | A1 | 5/2016 |
| DE | 10 2016 213 931 | A1 | 2/2018 |
| DE | 10 2018 131 441 | A1 | 6/2019 |
| JP | 2016-165977 | A | 9/2016 |
| JP | 2016-165978 | A | 9/2016 |
| JP | 2018-167695 | A | 11/2018 |
| JP | 2019-172152 | A | 10/2019 |
| WO | WO 2007/029583 | A1 | 3/2007 |

OTHER PUBLICATIONS

German-language Written Opinion (PCT/ISA/237) issued in PCT Application No. PCT/EP2022/067503 dated Oct. 18, 2022 with English translation (9 pages).

German Search Report issued in German Application No. 10 2021 118 025.2 dated Apr. 8, 2022 with partial English translation (10 pages).

English translation of Chinese Office Action issued in Chinese Application No. 202280027805.8 dated Mar. 31, 2026 (13 pages).

* cited by examiner

IMPACT ABSORBER HAVING SENSING AMPLIFIER

BACKGROUND AND SUMMARY

The present invention relates to an impact absorber for a bumper assembly of a motor vehicle, to a bumper assembly for a motor vehicle, as well as to a motor vehicle having a bumper assembly.

Generic bumper assemblies with impact absorbers are known from the prior art. Bumper assemblies serve in particular for absorbing energy in the event of an impact and, as a result, for avoiding damage to motor vehicles. At the same time, bumpers are to be conceived to minimize any effect on pedestrians or cyclists in the event of a collision with them and to overall contribute toward passive safety.

Known from DE 10 2016 213 931 A1 is a bumper assembly which is capable of making it possible for an impact to be sensed by means of a pressure hose. The bumper assembly here is specified in such a manner that it has locally variable deformability.

For current design concepts of vehicle front ends, in particular in the case of a so-called shark nose, a sensor-based concept by means of a pressure hose system of this type may not be sufficiently sensitive in order to be able to reliably trigger an active front flap for pedestrian protection, for example.

In this respect, the objective of identifying a pedestrian by means of the pressure hose system disposed in the front end of the vehicle may conflict with the objective of having a free deformation space.

Against the background of this prior art, the object of the present invention lies in providing a device which is suitable for overcoming at least the above-mentioned disadvantages of the prior art.

The object is achieved by the features of the independent claim. The dependent claims contain preferred refinements of the invention.

Accordingly, the object is achieved by an impact absorber for a bumper assembly of a motor vehicle.

The impact absorber is fastenable to a crossbeam of the motor vehicle and is provided to at least partially absorb the input of energy acting on the impact absorber during a collision and to provide the energy input to a force transmission portion, which is operatively connectable to a pressure sensor installation, so that the collision is detectable by the pressure sensor installation.

The impact absorber has an absorption portion and a force transfer portion.

The force transfer portion is provided to transmit the input of energy acting on the impact absorber during the collision to the force transmission portion while at least partially circumventing regions of the absorption portion.

The force transfer portion is designed in such a manner that the force transfer portion collapses in the event of an input of energy that is so high that the detection of the collision by means of the pressure sensor installation is possible without the circumvention of regions of the absorption portion.

In other words, the absorption portion serves for absorbing impact energy, in particular by way of deformation. The force transmission portion can be formed by a portion of the impact absorber that can act on a component of the pressure sensor installation. A component of this type can be, for example, a pressure hose. The force transmission portion can be formed by a region or portion of the impact absorber that can establish contact with the pressure hose in order to act on the pressure hose, or to transmit to the pressure hose the impact force or impact energy directed into the force transmission portion.

In this way, a force or energy that acts on the impact absorber during an impact can at least be partially diverted ideally directly into a region which is operatively connectable to a pressure hose, or in which a pressure hose can be received. It is thus possible to divert the energy of a triggering impactor ideally directly onto the pressure hose system of a pedestrian protection sensory assembly. Therefore, the force transfer portion may also be referred to as a sensing amplifier or sensor assembly amplifier.

The force transfer portion here is designed such that an energy or a force resulting from a comparatively weak impact is reliably transmitted to the pressure hose. In the process, the force transfer component can at least partially direct the force so as to bypass the absorption portion, as a result of which the latter is bridged. The force transfer component and one part of the absorption portion can thus be designed in the manner of a parallel circuit in which part of the force flux is effected by way of the part of the absorption portion, and part of the force flux is effected by way of the force transfer component.

Moreover, the force transfer portion here is designed such that an energy or force resulting from a comparatively heavy impact leads to the force transfer portion collapsing, in particular in controlled manner.

Summarizing, the invention is therefore based on the concept that, so as to be controlled by the input of energy, a sensor signal for the pressure hose system is amplified by means of the force transfer portion acting as a sensing amplifier in the event of a low input of energy, on the one hand, and a required deformation path, in particular in the event of a leg impact, is moreover released on account of the collapsing force transfer region in the event of a high input of energy.

The force transfer portion, which forms a first load path is designed to transfer, in particular directly, for example by way of a sensor check element, an input of energy which deforms the front end of the vehicle into the pressure hose sensor in order to trigger an active front flap.

The force transfer portion here is designed in such a manner that it collapses at inputs of energy that are higher than those required for sensing, and in the process releases a predefined deformation path, the absorption portion in the process forming a second load path and the input of energy being so high that the transmission by way of the second load path is sufficient for sensing.

In this way, the conflicting objectives of design parameter, sensing requirement, and crash requirement, as described at the outset, can be met.

Collapsing herein can be understood to mean that the force transfer portion in the motor vehicle longitudinal direction is deformed in such a way that the force transfer portion during the collision does not substantially exert any force acting counter to a force that acts on the front end of the vehicle as a result of the collision. This can take place, for example, as a result of the force transfer portion breaking and/or being elastically and/or plastically deformed during the collision. It is contemplated for the force transfer portion to have a honeycomb-type structure which is deformed, in particular reversibly in the sense of a shape-memory alloy, in the motor vehicle longitudinal direction during the collision. It is also contemplated for the force transfer portion to have a predetermined breaking point.

It is contemplated for the force transfer portion to collapse when the input of energy exceeds a threshold value, the threshold value being 633 J, in particular 465 J, 405 J, or 323 J.

The force transfer portion can at least in part be received in the absorption portion.

The force transfer portion can in particular be completely integrated or received in the absorption portion. For example, the force transfer portion can be cast in a material of the absorption portion. Alternatively, the force transfer portion can partially protrude from the absorption portion, or project from the latter. In this way, the input of energy can first act on the force transfer portion, as a result of which the energy can be reliably transmitted by way of the force transmission portion.

The force transfer portion can be configured to be stiffer than the absorption portion.

As a result of the stiffness being increased in comparison to the absorption portion, the force transmission by way of the force transfer portion is improved. Differences in the stiffness can be generated by a corresponding choice of materials. For example, the force transfer portion can be injection-molded from a non-foaming plastic material, and the absorption portion can be produced from an expanded plastic foam material. For example, the force transfer portion can be produced in a first step and be overmolded with a material—while forming the absorption portion. A multi-component injection-molding method may be used to this end, for example.

The absorption portion and the force transmission portion can be integrally configured. The absorption portion and the force transmission portion can be produced from the same material.

The absorption portion and/or the force transmission portion can be produced from an expanded plastic foam material. The force transfer portion can be produced from a plastic material. The force transfer portion can be produced from the same plastic material or from a different plastic material, for example a non-foamed plastic material. Classic primary forming methods for processing plastic material, for example injection-molding, foaming and casting, may be used as manufacturing methods for the absorption portion, the force transmission portion and/or the force transfer portion. Additionally or alternatively, 3D printing methods may be used.

In one specific embodiment it is contemplated for the force transfer portion to be incorporated in the absorption portion formed from foam as an injection-molded plastic element which projects forward in the motor vehicle longitudinal direction (other materials and/or production methods also being contemplated here).

When viewed in the cross section in the direction of travel of the vehicle, the absorption portion and the force transmission portion can form a U-shape of which the open end is oriented in the direction of travel. The force transfer portion can be received in the U-shape. Two mutually opposite legs of the U-shape can be formed by the absorption portion.

A connection portion which connects the mutually opposite legs can be formed by the force transmission portion. The force transfer portion can be partially received in the U-shape so that a front portion of the force transfer portion protrudes from the open end of the U-shape.

The force transmission portion can have a recess, for example a groove, for receiving a pressure hose of the pressure sensor installation.

The force transfer portion can be formed by a plurality of force transfer segments that are disposed next to one another in the direction of longitudinal extent of the impact absorber. The individual force transfer segments can be adapted to the respective position in the impact absorber. In this way, a balance between the effect of sensing/detecting, or force transmission, on the pressure hose and an effect on the leg check element can be positively influenced and adapted to required threshold values. In this way, force adaptation on a portion-by-portion basis is possible. To this end, the force transfer segments can have different shapes so as to take into account current design concepts.

The force transfer segments can at least in part be of identical configuration. The force transfer segments can be disposed so as to be mutually offset in the longitudinal direction of the vehicle. The force transfer segments can be configured as individual segments. Absorption segments of the absorption portion can be provided between adjacent force transfer segments.

At least one force transfer segment can have a force-absorbing face for absorbing the force acting during the collision, and a force transmission face which faces the force transmission portion. The force-absorbing face and the force transmission face can be operatively connected by way of a force transfer region, for example by way of a web or by way of any other suitable force transmission structure which may have one or a plurality of elements for transmitting force. For example, the force transfer region can have a honeycomb-type structure.

At least one force transfer segment can be configured in the shape of an I. The force transfer segment can have two flanges. The flanges can be connected by way of a web which forms the force transfer region. One force transfer segment, or a plurality of force transfer segments, can have a front flange and a rear flange.

The rear flange can be provided on a rear end portion of the web and can face the force transmission portion. For example, the rear flange can have a force transmission face which faces the force transmission portion. The force transmission face can form the force transmission portion. The force transmission face may be planar or curved.

A transmission of force from the force transmission face to a pressure hose can take place indirectly by way of an additional force transmission portion, or can take place directly, wherein in this instance a portion of the force transfer portion, for example the rear flange, forms the force transmission portion and can establish direct contact with the pressure hose.

The front flange can be provided on a front end portion of the web. The front flange can be disposed in the region of the open end of the U-shape of the absorption portion. The front flange can have a force-absorbing face. The force-absorbing face can be oriented in the direction of travel. The force-absorbing face can be inclined in relation to the direction of travel, or longitudinal direction of the vehicle, respectively. The force-absorbing face can be curved, for example so as to bulge toward the front.

The force transfer segments can extend transversely to the direction of main extent of the force transfer portion, or in the fastened state in the vehicle, extend in the longitudinal direction, or direction of travel of the vehicle, respectively. The web connecting the flanges can extend transversely to the direction of main extent of the force transfer portion, or in the longitudinal direction, or the direction of travel, of the vehicle when the force transfer portion is assembled on a vehicle. The web can be configured so as to be at least in part straight, completely straight, or at least in part curved or bent, or continuously curved or bent. Alternatively, the web can extend so as to be inclined in relation to the main direction of extent and inclined in relation to the longitudinal direction, or the direction of travel, of the vehicle. One or a plurality of webs of individual force transfer segments can extend so as to be mutually parallel. Two force transfer segments can be disposed in such a manner that their webs intersect. Alternatively, the flanges can also be connected by way of a plurality of webs, in particular while forming a shape deviating from the I-shaped design embodiment mentioned above. The flanges can also be connected by a honeycomb-type structure, wherein the webs connecting the flanges may at least in part form a honeycomb structure, or each web may be configured as a honeycomb structure. The flanges can be separate elements, or be an integral component part of the web. For example, instead of being configured in an I-shape, a force transfer segment can also be configured to be honeycomb-shaped, for example hexagonal. Here, a flat side of such a honeycomb structure can form a flange, or support such a flange.

At least two adjacent force transmission segments can be coupled to one another by way of at least one connection web. The connection web can be disposed in such a way that it connects adjacent webs of the force transmission segments. The webs of the force transmission segments and the connection web can be produced integrally, for example as a casting. The intermediate spaces formed by the webs, the connection web and internal walls of flanges can at least partially receive part of the absorption portion. In other words, intermediate spaces of this type can be filled with an absorption material while partially forming the absorption portion.

Furthermore disclosed is a bumper assembly having a crossbeam and an impact absorber which is disposed on the crossbeam. The impact absorber can be constructed as described above. Furthermore disclosed is a vehicle having a bumper assembly of this type, wherein the vehicle can have an active front flap which is operatively connected to the pressure sensor installation. In this way, the pressure sensor installation can serve for triggering the active front flap.

The vehicle may be a motor vehicle, in particular an automobile.

The triggering of the active front flap can result in the front flap being lifted in the vertical direction of the vehicle. As a result, a spacing between the front flap and components, for example an engine block, which are disposed below the front flap can be enlarged.

An embodiment will be described hereunder with reference to the figures.

The same reference signs are used for identical items in the description hereunder.

DETAILED DESCRIPTION OF THE DRAWINGS

Figure 3:
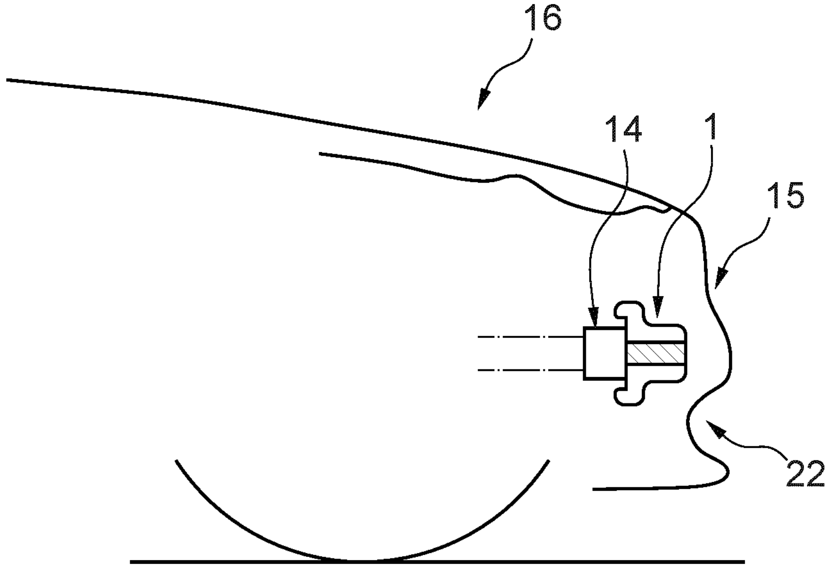
FIG. 3 is a schematic lateral view of a front portion of a vehicle having the impact absorber from FIGS. 1 and 2.

FIG. 3 shows a partially sectional, schematic lateral view of a front region of a motor vehicle 16. The motor vehicle 16 comprises a bumper assembly 22 which has a bumper trim 15, a crossbeam 14, and an impact absorber 1 provided on the crossbeam 14.

The crossbeam 14 and the impact absorber 1 extend in each case in the transverse direction of the vehicle 16, i.e. so as to be in particular substantially perpendicular to a direction of travel F, wherein the impact absorber 1 in the longitudinal direction of the vehicle 16 is disposed between the bumper trim 15 and the crossbeam 14. In the event of an impact, the energy acting on the bumper trim 15 can be dissipated by the impact absorber 1 and transferred to a pedestrian protection sensor assembly.

Figure 1:
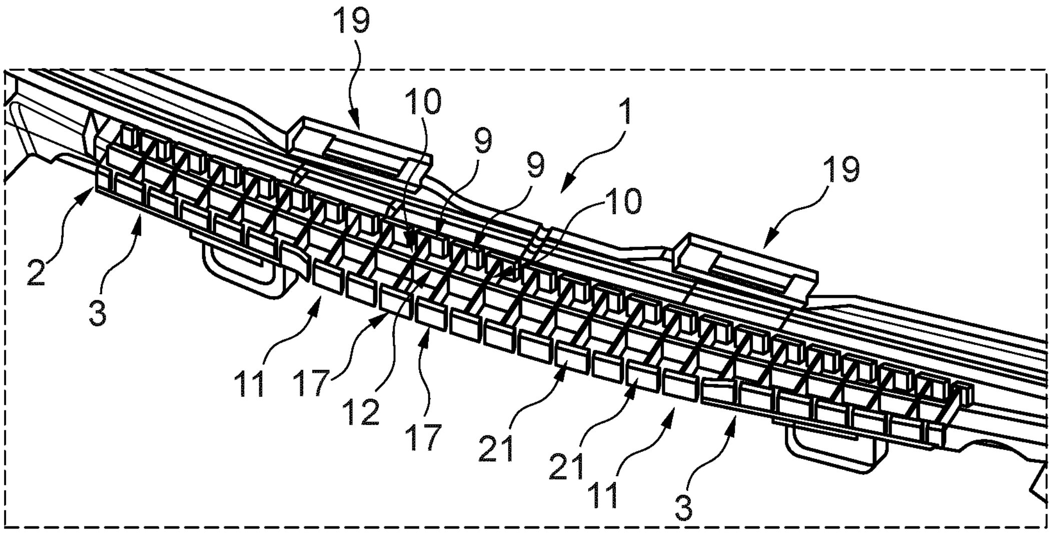
FIG. 1 is a perspective view of an impact absorber.
Figure 2:
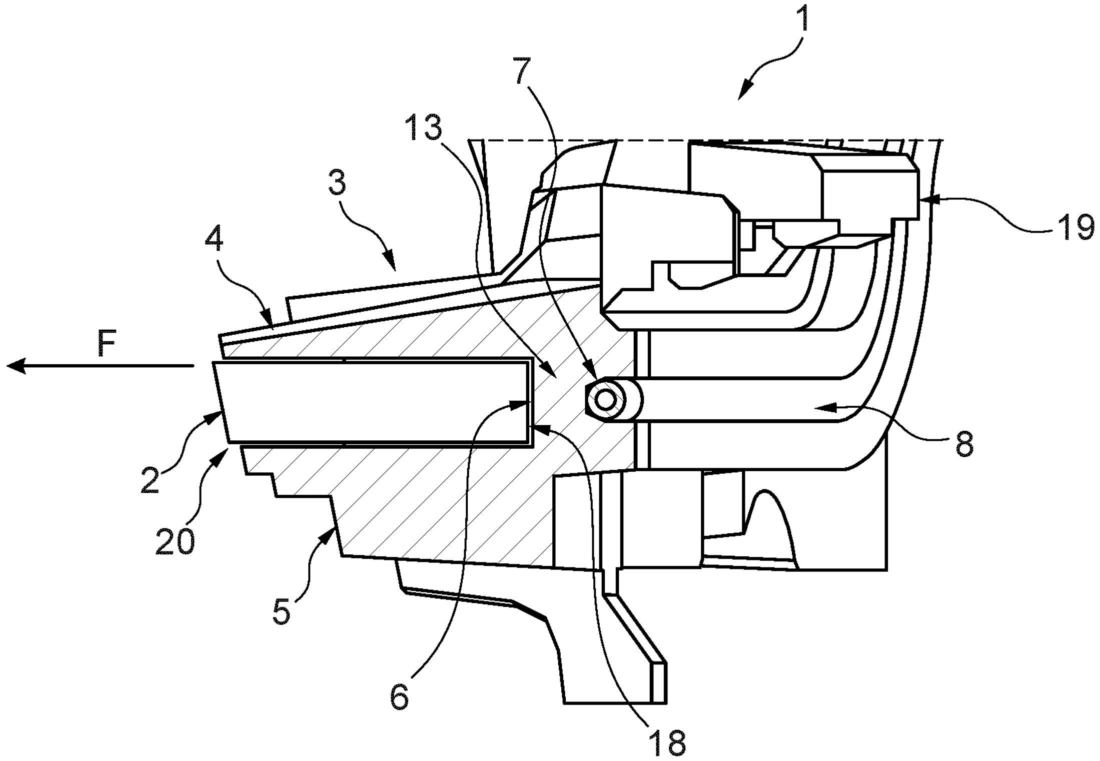
FIG. 2 is a cross-sectional view of the impact absorber from FIG. 1.

FIG. 1 shows a perspective view of the impact absorber 1; FIG. 2 showing a cross-sectional view of the impact absorber 1.

The impact absorber 1, conjointly with the crossbeam 14 shown in FIG. 3, can form a bumper assembly 22, and has a force transfer portion 2 and an absorption portion 4. The impact absorber 1 on its rear side moreover has fastening installations 19 for fastening the impact absorber 1 to the crossbeam 14.

It is to be noted here that in the view shown in FIG. 1, an upper region of the absorption portion 3, above the force transfer portion 2, is not illustrated in order to show more clearly the construction of the force transfer portion 2.

The impact absorber 1 is provided to at least partially absorb the input of energy acting on the impact absorber 1 during a collision, the input of energy acting substantially counter to the direction of travel F. To this end, the impact absorber 1 has the absorption portion 3 and the force transfer portion 2.

Moreover, the impact absorber 1 is provided to provide the input of energy acting on the impact absorber 1 during a collision to the force transmission portion 13, which is operatively connected to a pressure hose 7, so that the collision is detectable by a pressure sensor installation which has the pressure hose 7.

The more specific construction of the impact absorber 1, and in particular of the absorption portion 3, is illustrated in FIG. 2.

When viewed in the cross section, the absorption portion 3 and a force transmission portion 13 form a U-shape. The open end of the U-shape is oriented in the direction of travel F, the latter here running parallel to the vehicle longitudinal direction. Two mutually opposite legs 4, 5 of the U-shape are formed by the absorption portion 3. A connection portion 6, which connects the mutually opposite legs 4, 5, is formed by the force transmission portion 13. The force transfer portion 2 is in part received in the U-shape, wherein a front portion 20 of the force transfer portion 2 protrudes from the open end of the U-shape.

In the event of an impact on the bumper assembly 22, owing to the arrangement shown in FIG. 2, a force or energy is initially applied to the front portion 20 of the force transfer portion 2 that protrudes from the absorption portion 3, as a result of which this front portion 20 is urged in the direction of the force transmission portion 13. A deformation of the force transfer portion 2 may also arise in the process. The force transmission face 18 is pushed onto the force transmission portion 13 in the process. The force transmission portion 13 transmits the force received by the force transmission face 18 to the pressure hose 7. The pressure variation generated in the pressure hose 7 can be detected by sensors (not illustrated), so that the impact is reliably detected.

More specifically, the force transmission portion 13 delimits a receptacle space, defined between the legs 4, 5, for the force transmission portion 2, thus forming a connection portion 6 between the upper leg 4 and the lower leg 5, on the one hand. On the other hand, the force transmission portion 13, on a side facing away from the receptacle space, or on a side facing the crossbeam 14, respectively, has a recess in the form of an elongate groove 8. A pressure sensor installation in the form of a pressure hose 7, as illustrated in FIG. 2, is disposed in the groove 8. In the embodiment, the force transmission portion 13 is thus disposed between the force transfer portion 2 and the pressure hose 7, so that a transmission of force from the force transfer portion 2 to the pressure hose 7 can take place by way of the force transmission portion 13. The force transmission portion 13 is designed to be deformable in order to enable a transmission of force to the pressure hose 7.

In this design embodiment, a force flux to the pressure hose 7 is thus possible while partially circumventing the absorption portion 3, as a result of which a reliable action on the pressure hose 7 and more reliable sensing or detecting of an impact is possible.

Moreover, the force transfer portion 2 here is designed or configured in such a manner that the force transfer portion 2 collapses in the event of an input of energy of such a magnitude that the detection of the collision is possible by means of the pressure sensor installation which has the pressure hose 7, without circumventing regions of the absorption portion 3.

This is presently implemented in that the force transfer portion 2 collapses, herein breaks, when the input of energy acting counter to the direction of travel F on the force transfer portion 2 exceeds a threshold value, or critical value, of 633 J, in particular 465 J, 405 J, or 323 J.

As a result of the force transfer portion 2 collapsing, herein breaking, at such a high input of energy that exceeds the threshold value, the force transfer portion 2 releases a deformation path in the vehicle longitudinal direction. However, the collision can continue to be sensed by means of the pressure hose 7, by way of a transmission of force via the force transmission portion 13.

The force transfer portion 2 is configured in the manner of a mesh and extends along, and in part within, the absorption portion 3. In the state assembled on the vehicle 16, the directions of main extent of the force transfer portion 2 and of the absorption portion 3 are oriented in the transverse direction of the vehicle 16.

The absorption portion 3 and the force transfer portion 2 are elongate components, each of which being integrally configured. Alternatively, the absorption portion 3 and/or the force transfer portion 2 can be configured in multiple parts. The absorption portion 3 is formed from an expanded plastic foam material which has positive absorption properties. In particular, the expanded plastic foam material is deformable in order to absorb impact energy. However, it is contemplated for other materials to be used for the absorption portion 3. The force transfer portion 2 is produced from a plastic material which has a higher stiffness than the expanded plastic foam material of the absorption portion 3, and in the embodiment shown is produced by injection-molding.

According to the embodiment, the force transfer portion 2 has a plurality of force transfer segments 11. The force transfer segments 11 extend transversely to the main direction of extent of the force transfer portion 2, or, in the state fastened to the vehicle 16, extend in the longitudinal direction, or the direction of travel F of the vehicle 16, respectively.

These individual force transfer segments 11 collapse when the input of energy onto the individual force transfer segment 11 exceeds the threshold value described above.

In the embodiment shown, the force transfer segments 11 are configured in an I-shape. According to the embodiment, the force transfer segments 11 have two flanges 9, 17. The flanges 9, 17 are connected by way of a web 10.

In the embodiment shown, the web 10 extends transversely to the direction of main extent of the force transfer portion 2, or in the longitudinal direction or direction of travel F of the vehicle, respectively, when the force transfer portion 2 is assembled on the vehicle 16. However, the web 10 may also be configured differently as long as a sufficient transfer of force between the flanges 9, 17 is possible. In particular, the web 10 may be configured to be curved or bent. Alternatively, the web 10 can extend so as to be inclined in relation to the direction of main extent and inclined in relation to the longitudinal direction, or the direction of travel F of the vehicle 16, respectively. One or a plurality of webs 10 of individual force transfer segments 11 can extend so as to be mutually parallel. Two force transfer segments 11 can be disposed in such a manner that the webs 10 thereof intersect. Alternatively, the flanges 9, 17 can also be connected by way of a plurality of webs, in particular while forming a shape deviating from the I-shaped design embodiment mentioned above. The flanges 9, 17 can also be connected by a honeycomb-type structure, wherein the webs that connect the flanges 9, 17 at least in part form the honeycomb structure. The flanges 9, 17 can be separate elements, or can be an integral component part of the web. For example, instead of being configured to be I-shaped, a force transfer segment can also be configured to be honeycomb-shaped, for example hexagonal. A flat side of such a honeycomb structure here can form or support a flange 9, 17. The honeycomb structure can be plastically or elastically deformed, i.e. collapse, when the threshold value described above is exceeded. Here too, a deformation path can be released as a result of the deformation of the honeycomb structure.

The flanges 9, 17 in the embodiment shown are disposed such that these flanges 9, 17 extend transversely to the direction of travel F when the impact absorber 1 is fastened to the vehicle 16. In particular, the flanges can extend so as to correspond to the desired external contour of a bumper, or follow the latter, respectively.

One of the flanges of the flanges 9, 17 of the force transmission segments 11 forms a front flange 17, and one flange forms a rear flange 9. The rear flange 9 is provided on a rear end portion of the web 10 and faces the force transmission portion 13. The rear flange 9 has a force transmission face 18 which faces the force transmission portion 13. Alternatively, the rear flange 9 per se can form the force transmission portion. In this case, the force transmission portion 13 in the region of the flange 9 can be omitted so that the force transmission face 18 can establish direct contact with the pressure hose 7.

The front flange 17 can be provided on a front end portion of the web 10. The front flange 17 is disposed in the region of the open end of the U-shape of the absorption portion 3. The front flange 17 has a force-absorbing face 21. The force-absorbing face 21 is oriented in the direction of travel F. Adjacent force transmission segments 11 are connected to one another by means of a connection web 12. In the embodiment shown, the webs 10 and the connection webs 12 are integrally formed. The connection webs 12 keep the force transmission segments 11 at a predetermined mutual spacing.

LIST OF REFERENCE SIGNS

1 Impact absorber
2 Force transfer portion
3 Absorption portion
4 Upper leg
5 Lower leg
6 Connection portion
7 Pressure sensor installation/pressure hose
8 Recess/groove
9 Rear flange
Force transfer region/web
11 Force transfer segment
12 Connection web
13 Force transmission portion
14 Crossbeam
15 Bumper trim
16 Motor vehicle
17 Front flange
18 Force transmission face
19 Fastening installation
20 Front portion
21 Force-absorbing face
22 Bumper assembly
F Direction of travel

The invention claimed is:

1. An impact absorber for a bumper assembly, having a crossbeam, of a motor vehicle, comprising:

a force transmission portion;

an absorption portion; and a force transfer portion that is a separate structural element at least partially received within the absorption portion and forming a first load path that at least partially bypasses the absorption portion, wherein the impact absorber is fastenable to the crossbeam of the motor vehicle and is provided to at least partially absorb an input of energy acting on the impact absorber during a collision and to provide the input energy to the force transmission portion, which force transmission portion is operatively connectable to a pressure sensor installation, so that the collision is detectable by the pressure sensor installation, wherein the force transfer portion is configured to transmit the input of energy acting on the impact absorber during the collision to the force transmission portion while at least partially circumventing regions of the absorption portion thereby forming the first load path, and wherein the force transfer portion is configured such that the force transfer portion collapses in an event of an input of energy that is so high that the detection of the collision via the pressure sensor installation is possible without the circumvention of regions of the absorption portion, wherein upon collapse the force transfer portion releases a predefined deformation path and the absorption portion forms a second load path for transmitting the input of energy to the force transmission portion.

2. The impact absorber according to claim 1, wherein the force transfer portion collapses when the input of energy exceeds a threshold value, the threshold value being 633 J.

3. The impact absorber according to claim 1, wherein the force transfer portion is at least in part received in the absorption portion and/or is configured to be stiffer than the absorption portion.

4. The impact absorber according to claim 1, wherein the absorption portion and the force transmission portion are integrally configured.

5. The impact absorber according to claim 1, wherein the absorption portion and/or the force transmission portion are made of an expanded plastic foam material, and/or the force transfer portion is made of a plastic material.

6. The impact absorber according to claim 1, wherein the absorption portion and the force transmission portion form a U-shape when viewed in a cross section in a direction of travel, of which an open end is oriented in the direction of travel, and the force transfer portion is received in the U-shape, two mutually opposite legs of the U-shape are formed by the absorption portion, a connection portion which connects the mutually opposite legs, is formed by the force transmission portion, and the force transmission portion has a recess for receiving a pressure hose of the pressure sensor installation.

7. The impact absorber according to claim 1, wherein the force transfer portion is formed by a plurality of force transfer segments that are disposed next to one another in the direction of main extent of the impact absorber.

8. The impact absorber according to claim 7, wherein at least one of the force transfer segments has a force-absorbing face for absorbing the force acting during the collision, and a force transmission face which faces the force transmission portion, the force-absorbing face and the force transmission face being operatively connected by a force transfer region.

9. A bumper assembly, comprising:

a crossbeam;

a pressure installation; and an impact absorber according to claim 1, wherein the impact absorber is disposed on the crossbeam.

10. A vehicle comprising:

a bumper assembly according to claim 9; and an active front flap which is coupled to the pressure sensor installation.

* * * * *